United States Patent [19]

Hirose et al.

[11] Patent Number: 5,295,407
[45] Date of Patent: Mar. 22, 1994

[54] ELECTRIC LINEAR ACTUATOR

[75] Inventors: Goro Hirose, Higoshi; Masahito Sato, Maebashi; Daisaku Kawada, Yoshioka; Akio Sakai, Maebashi, all of Japan

[73] Assignee: NSK Ltd., Tokyo, Japan

[21] Appl. No.: 937,288

[22] Filed: Aug. 31, 1992

[30] Foreign Application Priority Data

Sep. 4, 1991 [JP] Japan .................. 3-78759[U]
Dec. 24, 1991 [JP] Japan .................. 3-111573[U]

[51] Int. Cl.⁵ ............................................... F16H 25/22
[52] U.S. Cl. ..................... 74/459; 74/424.8 NA; 74/424.8 R
[58] Field of Search .......... 74/424.8 R, 424.8 NA, 74/89.15, 459

[56] References Cited

U.S. PATENT DOCUMENTS

| | | | |
|---|---|---|---|
| 2,959,978 | 11/1960 | Boutwell | 74/459 |
| 2,995,948 | 8/1961 | Galonska et al. | 74/459 |
| 3,068,713 | 12/1962 | Davis | 74/459 X |
| 3,512,426 | 5/1970 | Dabringhaus | 74/459 |
| 4,920,817 | 5/1990 | Granbom | 74/424.8 NA |

FOREIGN PATENT DOCUMENTS

| | | | |
|---|---|---|---|
| 4-131549 | 5/1992 | Japan | 74/424.8 NA |
| 513096 | 10/1939 | United Kingdom | 74/459 |

*Primary Examiner*—Allan D. Herrmann
*Attorney, Agent, or Firm*—Shapiro and Shapiro

[57] ABSTRACT

An electric linear actuator includes an output shaft which is non-rotatable but displaceable in an axial direction and which has one end thereof coupled to a driven device; a cylindrical member arranged coaxially with the output shaft and rotatably about the output shaft, and driven by an electric motor for rotation; and a feed screw mechanism arranged between the output shaft and the cylindrical member for converting a rotating motion of the cylindrical member to a linear motion of the output shaft. The feed screw mechanism has a male spiral groove formed in the outer peripheral surface of the output shaft; a nut cylinder secured on the inner peripheral side of the cylindrical member and formed with a plurality of circular holes; and a plurality of balls accommodated in the circular holes and engaged with the male spiral groove.

9 Claims, 5 Drawing Sheets

ELECTRIC LINEAR ACTUATOR

BACKGROUND OF THE INVENTION

1. Field of the Invention

This invention relates to an electric linear actuator. A linear actuator is utilized, for example, for driving a flow rate control valve or the like disposed in a hydraulic circuit.

2. Related Background Art

In a hydraulic circuit provided, for example, in an automotive vehicle, an electric linear actuator is preferably employed in order to drive a flow rate control valve based on an instruction from a controller. Generally, linear actuator constituted by a combination of a solenoid and a compression spring has been used. This type of linear actuator is constructed such that a displacement member such as a rod is urged by the compression spring in one of the axial directions, and when this displacement member need is to be displaced, the solenoid is energized to displace the displacement member in the axial direction against the urging force of the compression spring. The displacement member is displaced and stopped at a position where the urging force of the compression spring balances with a force of the solenoid. A displacement amount of the displacement member is adjusted by controlling the amount of current to the solenoid and changing the magnitude of force which the solenoid exerts on the displacement member.

An electric linear actuator utilizing a solenoid as mentioned above requires a large current to be supplied to the solenoid when the displacement member is to be displaced against the urging force of the compression spring. However, a large current unfavorably causes an excessive load on a battery. Also, the structure for urging a displacement member by a compression spring as mentioned above presents large hysteresis, whereby even if an identical amount of current is supplied to the solenoid, a displacement amount of the displacement member can vary widely. For this reason, it is quite difficult to finely adjust an opening angle of a flow rate control valve by a linear actuator.

To solve the above problem, the present assignee has proposed an electric linear actuator as shown in FIGS. 11-12 (Japanese Patent Application No. 3-201142). Referring to FIG. 11, this electric linear actuator comprises an output shaft 124 made displaceable only in the axial direction by a support 122 formed in a housing 120; a cylinder 126 arranged concentrically with this output shaft 124 for rotation about it; a torsion coil spring 130 arranged between the cylinder 126 and a casing 128 for applying to the cylinder 126 an urging force in the circumferential direction; a feed screw 135 arranged between the outer peripheral surface of the output shaft 124 and the inner peripheral surface of the cylinder 126 for displacing the output shaft 124 in the axial direction with the rotation of the cylinder 126; and an electric motor 132 arranged inside the casing 128 for rotating the cylinder 126, when energized, against the urging force of the torsion coil spring 130. The feed screw 135 is constituted by a spiral groove 138 formed in the outer peripheral surface of the output shaft 124, another spiral groove 140 formed in the inner peripheral surface of the cylinder 126, and a multiplicity of balls 142 accommodated between both grooves. An end of the output shaft 124 is inserted into a guiding portion 121 of the housing 120 which guides the output shaft 124 so as to block its rotation and allow displacement only in the axial direction.

In the above-mentioned electric linear actuator, when the electric motor 132 is not energized, the cylinder 126 is subjected to the rotational fore of the torsion coilspring 130. This force acts, by way of the feed screw 135, to bring the output shaft to one end of its range of movement in th axial direction. On the other hand, when the electric motor 132 is energized, the cylinder 126 is rotated until a rotating torque of the electric motor 132 determined in accordance with an amount of current balances with the urging force of the torsion coilspring 130, and the cylinder 126 is stopped in the balanced state. With the rotation of the cylinder 126, the output shaft 124 is displaced by the feed screw 135 toward the other end of its range of movement in the axial direction.

The above-mentioned electric linear actuator solves the problem inherent in conventional electric linear actuators utilizing a solenoid by virtue of the feed screw which smoothly operates to convert the moving direction of the output shaft. However, the following problems are still left unsolved.

Specifically, since the feed screw 135 for displacing the output shaft 124 in the axial direction with the rotation of the cylinder 126 is realized by a ball and thread mechanism constituted by the spiral grooves 138, 140 and balls 142, it requires a returning tube for the balls, which have moved to ends of the spiral grooves 138, 140, to be returned to the other ends of the spiral grooves 38, 140. Consequently, the feed screw 135 becomes complicated and large in size, thereby presenting difficulties in designing an electric linear actuator to be installed in a narrow area.

SUMMARY OF THE INVENTION

It is an object of the present invention to provide an electric linear actuator which is capable of solving the inconvenience in the above-mentioned prior art, and, more specifically, to provide a linear actuator having a feed screw that is made simple and compact by eliminating the need for a ball returning tube.

The achieve the above object, according to one aspect of the present invention, a linear actuator comprises an output shaft (10) displaceable only in the axial direction; a cylinder (14) arranged concentrically with this output shaft and rotatably about it; a feed screw (35) arranged between the outer peripheral surface of the output shaft and the inner peripheral surface of the cylinder for displacing the output shaft in the axial direction with the rotation of the cylinder; and an electric motor (36) for rotating the cylinder when it is energized. The feed screw (35) comprises a spiral groove (20) formed in the outer peripheral surface of the output shaft; a nut cylinder (22) secured on the inner surface of the cylinder; a plurality of holes opened through the inner peripheral surface of the nut cylinder; and a plurality of balls (18) rotatably accommodated inside each hole and protruding from the inner peripheral surface of the nut cylinder to be engaged with the spiral groove.

According to another aspect of the present invention, a linear actuator comprises a shaft (10) having a cylindrical outer peripheral surface; a male thread groove (80) formed in the outer peripheral surface of this shaft; a nut cylinder (70) having a cylindrical inner peripheral surface which is supported around the shaft concentrically with the shaft for rotation relative to the shaft; a female thread groove (78) formed in the inner peripheral surface of the nut cylinder in phase with the male thread groove; a plurality of balls (82) arranged between the female thread groove and the male thread groove; a pair of deflectors (90) each formed in a spiral coil shape which are secured on one of the outer peripheral surface of the shaft and the inner peripheral surface of the nut cylinder such that they are fitted in both end portions of the thread groove formed in the one peripheral surface; and a pocket (86) formed near the one peripheral surface in a discontinuous portion of the pair of deflectors for communicating different phase portions of the one thread groove with each other. The balls rolling along the one thread groove by the relative rotation of the shaft with the nut cylinder are fed into the pocket through an inner end portion of one of the pair of deflectors.

DETAILED DESCRIPTION OF THE PREFERRED EMBODIMENTS

Preferred embodiments of the present invention will hereinafter be described with reference to the accompanying drawings.

Figure 1:
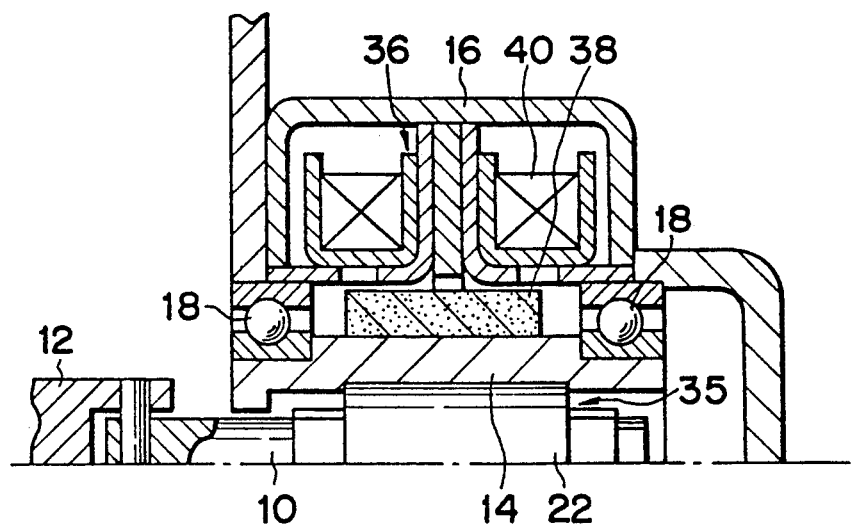
FIG. 1 is a diagrammatic vertical sectional view showing a first embodiment of the present invention (the lower half is omitted)
Figure 2:
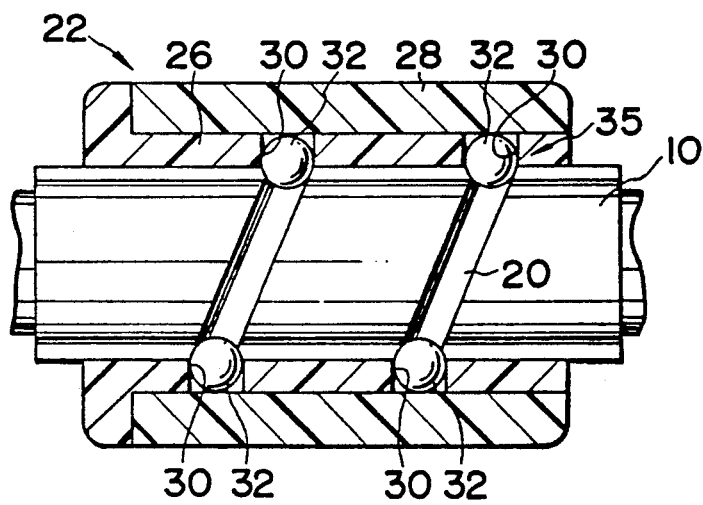
FIG. 2 is a vertical sectional view showing a main portion of the construction of FIG. 1.

FIGS. 1 and 2 show an electric linear actuator according to a first embodiment of the present invention. This electric linear actuator comprises an output shaft 10 coupled to a flow control valve (not shown) for moving in the left and right directions in FIG. 1; a cylinder 14 rotatable about the output shaft 10; and an electric motor 36 for rotating the cylinder 14. The structure will now be described in detail.

The output shaft 10 arranged in a central portion of the linear actuator displaces only in the axial direction without rotating, on the basis of engagement with a coupling rod 12, to drive a valve body or the like of a flow rate control valve (not shown). Around the output shaft 10, the cylinder 14 is arranged concentrically with the output shaft 10, and further arranged around the cylinder 14 is a casing 16. The cylinder 14 is rotatably supported by a pair of rolling bearings 18 inside the casing 16.

A spiral groove 20 is formed in the outer peripheral surface of the output shaft 10 at a position inside the cylinder 14, as shown in FIG. 2, and a nut cylinder 22 is secured on the inner peripheral surface of the cylinder 14 opposite to the spiral groove 20. This nut cylinder 22 comprises a collared retainer 26 made of an antifriction material such as nylon, PTFE or the like and a cylindrical cover 28 fitted around the outer peripheral surface of the retainer 26, also made of an anti-friction material.

The retainer 26 has a plurality of circular holes 30 formed therethrough along the spiral groove 20, and a ball 32 is held in each circular hole 30. A bottom surface is formed by the cover 28 on the outer peripheral surface side of the retainer 26, and the ball 32 protrudes inwardly from the inner peripheral surface of the retainer 26 and engages with the spiral groove 20 formed in the output shaft 10. A feed screw 35 is thus formed for displacing the output shaft 10 in the axial direction with the rotation of the cylinder 14.

Further, inside the casing 16, there is provided the electric motor 36 of, for example, stepping servo type, for rotating the cylinder 14. This motor 36 comprises a permanent magnet 38 fixed on the outer peripheral surface of the cylinder 14; and a stator 40 functioning also as a stator core which is arranged inside the casing 16.

In this embodiment, for displacing the output shaft 10, the stator 40 of the electric motor 36 is energized. With the energization of the stator 40, the cylinder 14, on which the permanent magnet 38 is fixed, is rotated, whereby the output shaft 10 is displaced in the axial direction by the action of the feed screw 35. Here, the feed screw 35 is constructed such that the balls 30 held in the circular holes 30 in the retainer 26 of the nut cylinder 22 are engaged with the spiral grooves formed in the output shaft 10 so that they move only in a circular path and are prevented from going and returning in the axial direction. This structure renders unnecessary a ball returning tube provided in the prior art example, whereby the feed screw 35 can be made correspondingly simple in structure.

Incidentally, for controlling a displacement amount of the output shaft 10 to a desired value, the electric motor 36 may be implemented by a rotating-angle controllable motor such as a stepping servo motor. Alternatively, a spring for displacing the output shaft 10 in one direction may be provided similarly to the prior art example in a manner that a displacement amount of the output shaft 10 is restricted by a balance between an urging force of this spring and an output torque of the electric motor.

Figure 3:
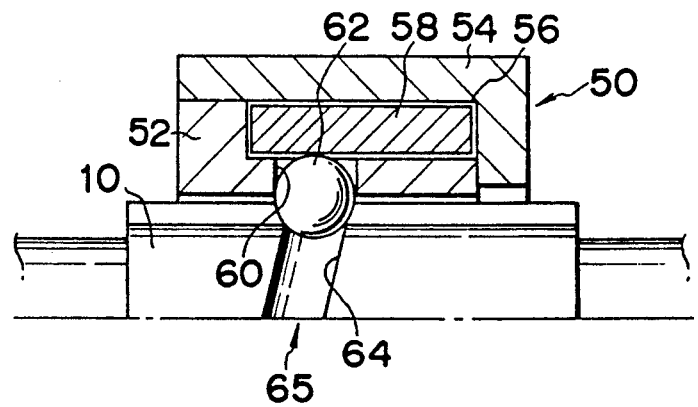
FIG. 3 is a cross-sectional view showing a main portion of a second embodiment of the present invention.
Figure 4:
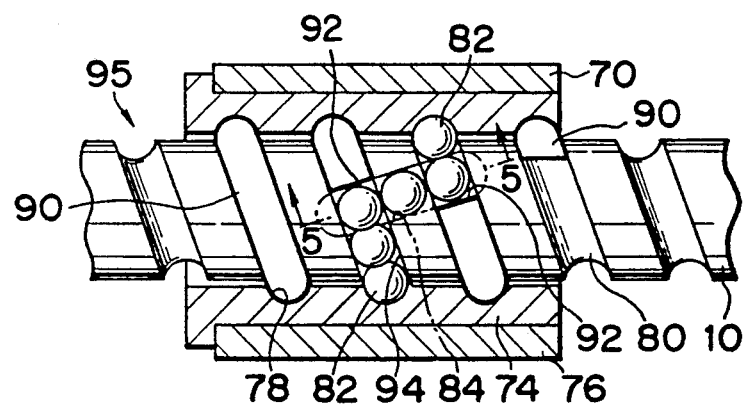
FIG. 4 is a cross-sectional view showing a main portion of a third embodiment of the present invention.

FIG. 3 shows a second embodiment of the present invention. In this embodiment, between the outer peripheral surface of a retainer 52 and the inner peripheral surface of a cover 54 constituting a nut cylinder 50, there is arranged an annular space 56 in which a rotating cylinder 58 is fitted for rotation relative to the retainer 52 and the cover 54. Then, a ball 62 held in a circular hole 60 contacts with the inner peripheral surface of the rotating cylinder 58 and protrudes inwardly from the inner peripheral surface of the retainer 52 to be engaged with a spiral groove 64. A feed screw 65 is constructed by the above elements.

In this embodiment, when the ball 62 held in the circular hole 60 rolls with the rotation of the nut cylinder 50, the rotating cylinder 58 with which the outer peripheral end of the ball 62 is in contact is rotated. For this reason, the ball 62 and the inner peripheral surface of the cover 54 are free from friction, thereby making it possible to more easily rotate the nut cylinder 50.

The electric linear actuators of the first and second embodiments can generate a large force with a low electric power consumption and can be used to control in a fine manner a variety of devices, such as a flow rate control valve, as electric linear actuators presenting small hysteresis. Further, since these electric linear actuators do not require a returning tube for circulating balls, and are accordingly reduced in size, the design of a compact electric linear actuator for use in a narrow place is easily carried out.

Next, a third embodiment of the present invention will be described with reference to FIGS. 4–8.

This embodiment differs from the first embodiment only in the structure of the feed screw, so that explanation will be given only of this part, and explanation of the remaining portions will be omitted.

Figure 6:
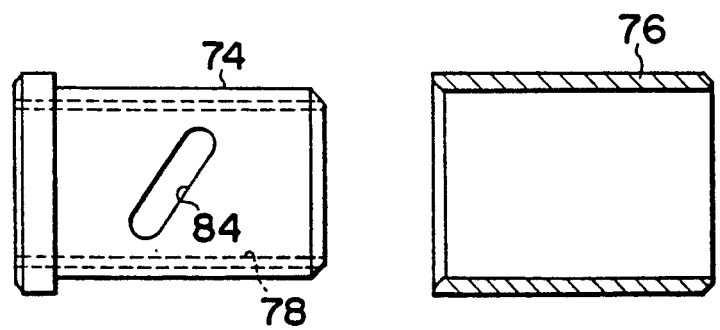
FIG. 6 is an exploded view showing a nut cylinder (70) in the third embodiment.
Figure 7:
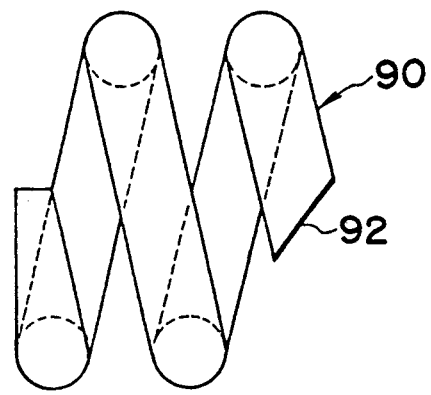
FIG. 7 is an elevational view showing a deflector (90) in the third embodiment.

Around an output shaft 10, a cylindrical nut cylinder 70 is supported concentrically with the output shaft 10 for rotation therearound. This nut cylinder 70 consists of a combination of a collared body 74 and a cover cylinder 76, as shown in FIG. 6. A female thread groove 78 having an arc-shaped cross-section is formed in the inner peripheral surface of the body 74 in phase with a male thread groove 80, and a multiplicity of balls 82 are accommodated between both thread grooves 78 and 80.

In an axial intermediate portion of the nut cylinder body 74, a long hole 84 is formed slanted in the direction opposite to the female thread groove 78. Both ends of this long hole 84 extend to different phase portions of the female thread groove 78, that is, two portions in part of the female thread groove 78 which are spaced from each other in the axial direction.

Figure 5:
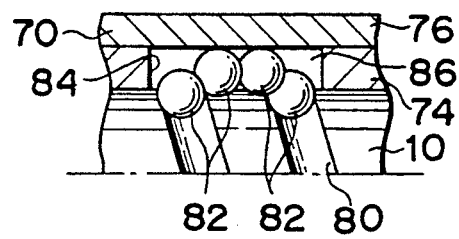
FIG. 5 is a sectional view taken along the line 5—5 in FIG. 4.

The cover cylinder 76 in turn has an inner diameter equal to the outer diameter of the body 74 or slightly shorter than that in a free state, and is fitted around the outside of the nut cylinder body 74 to form a groove bottom surface of the long hole 84 (see FIG. 5). The thickness of the nut cylinder body 74 is larger than the diameter of the balls 82.

In a state where the nut cylinder body 74 is combined with the cover cylinder 76 as described above, the long hole 84 forms a pocket 86 for returning to the original position the balls 82 which have been sent between the male thread groove 80 and the female thread groove 78 in one direction, as will be next described.

Further, at both ends of the female thread groove 78 formed in the inner peripheral surface of the nut cylinder 70 there are securely fitted deflectors 90. Each deflector 90, which is formed in the shape of a compression coil spring having the same pitch as that of the respective thread grooves, has a slope 92 at one end thereof. The deflectors 90 are securely fitted one by one into both end portions of the female thread groove 78. In an intermediate portion of the female thread groove 78, there is formed a spiral guide 94 in which the plurality of balls 82 can roll. The pocket 86 has its both end portions aligned with both end portions of this guide 94.

The slope 92 of the each deflector 90 is provided to feed into the pocket 86 the plurality of balls 82 which roll along the guide 94 in the intermediate portion of the female thread groove 78 by the rotation of the nut cylinder 70 and reach the end of the guide 94 (see FIG. 5). Incidentally, the deflectors 90 are arranged at both end portions of the female thread groove 78 in consideration of the nut cylinder 70 which is rotatable in both directions. Each ball 82 is pushed by the next ball 82 to move from the pocket 86 to the male thread groove 80 without action of the deflectors 90. In this embodiment, when the nut cylinder 70 is rotated by an electric motor or the like, the plurality of rolling balls 82 move along the female thread groove 78 in the nut cylinder 70. In this event, since the output shaft 10 cannot rotate, each ball 82 urges the side face of the male thread groove 80 formed in the outer peripheral surface of the output shaft 10 to displace the output shaft 10 in the axial direction.

When the rotational motion of the nut cylinder 70 is converted to a linear motion of the output shaft 10 by the feed screw 95, each ball 82 is brought in one direction along the guide 94 formed in the female thread groove 78 and reaches one end of the guide 94, i.e., the slope 92 of the deflector 90. The balls 82 which have reached the end of the guide 94 are guided by the slope 92 to be fed into the pocket 86. The balls 82 are continuously fed into the pocket 86 by the slope 92 as long as the nut cylinder 70 rotates. Therefore, the balls 82 which have previously been fed into the pocket 86 are pushed by subsequently fed balls 82 and sent along the pocket 86 to a different phase portion of the female thread groove 78 (the adjacent groove portion), and move, while rolling, along the male thread groove 80 and the female thread groove 78. Therefore, a returning tube and a die are not necessary for returning the balls 82, thereby achieving a reduction in size of ball screw device.

Figure 8:
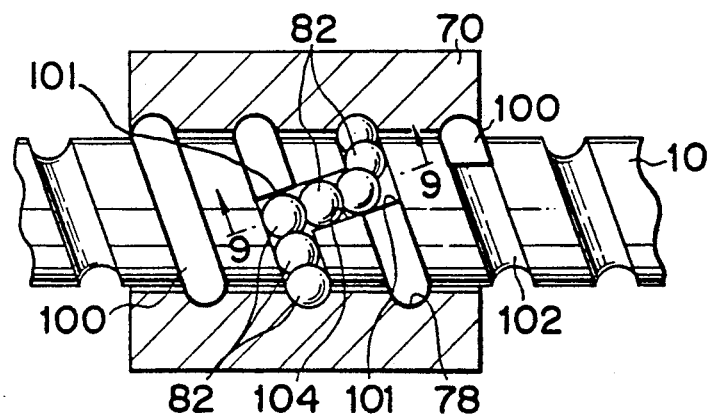
FIG. 8 is a cross-sectional view showing a main portion of a fourth embodiment of the present invention.
Figure 9:
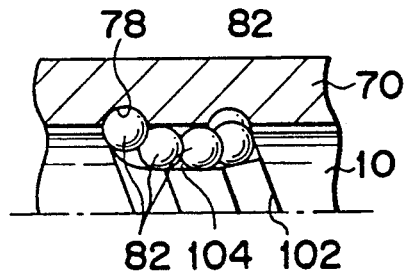
FIG. 9 is a sectional view taken along the line 9—9 in FIG. 8.

Next, a fourth embodiment of the present invention will be described with reference to FIGS. 8 and 9. While the third embodiment has shown the structure where a pair of deflectors 90 are securely fitted in both end portions of the female thread groove 78 and the pocket 86 is formed in the inner peripheral surface of the nut cylinder 70, this embodiment provides a structure where a pair of deflectors 101 each having a slope 100 are securely fitted around both end portions of a male thread groove 102 and a recess 104 is formed in the outer peripheral surface of an output shaft 10 in the same direction as the foregoing long hole 84. The rest of the structure and actions of this embodiment are similar to those of the third embodiment.

Incidentally, the devices of the third and fourth embodiments may be provided with deflectors and pockets at a plurality of locations in the axial direction for the purpose of improving the load capacity and preventing the nut cylinder and the output shaft from inclining.

Figure 10:
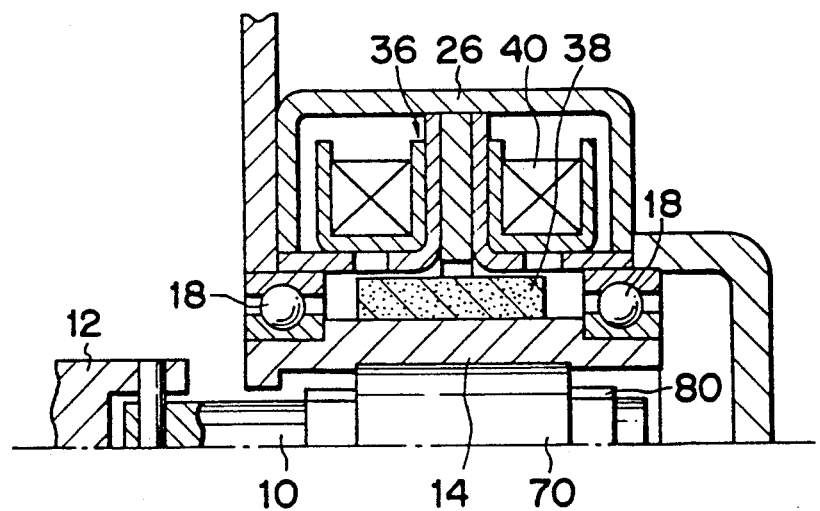
FIG. 10 is a diagrammatic cross-sectional view showing the whole arrangement of the fourth embodiment shown in FIG. 8.
Figure 11:
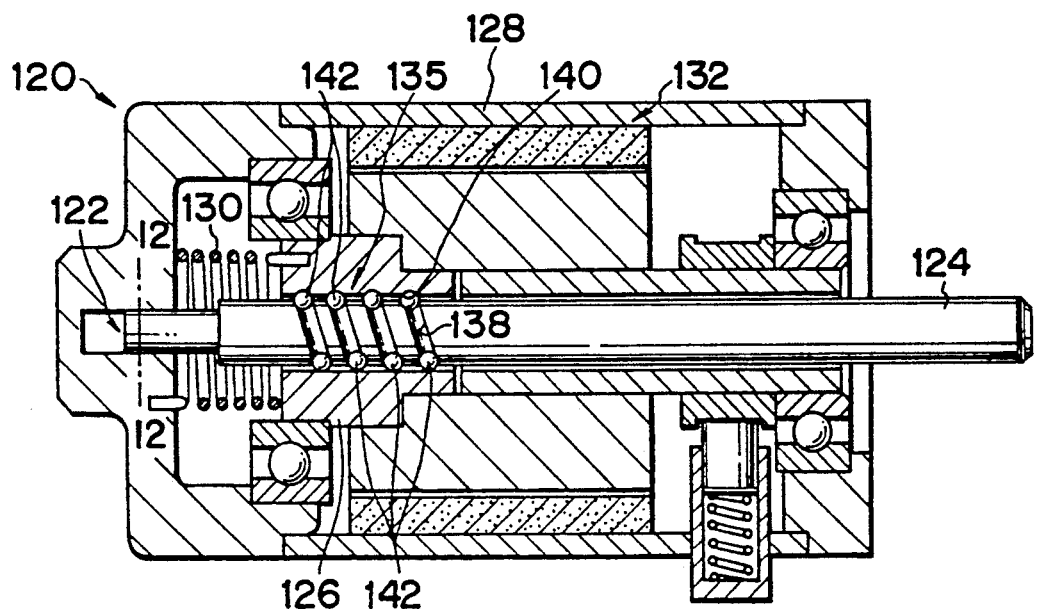
FIG. 11 is a cross-sectional view showing the whole arrangement of a prior art example.
Figure 12:
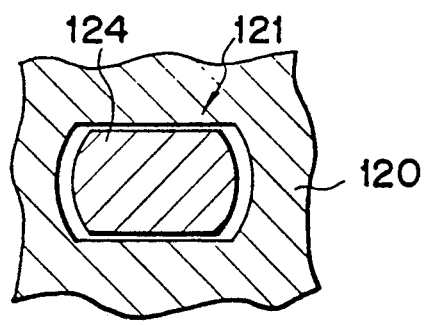
FIG. 12 is a sectional view taken along the line 12—12 in FIG. 11.

FIG. 10 shows the ball and thread device of the third embodiment incorporated in an electric linear actuator, where the general arrangement is similar to that of FIG. 1 so that like parts are designated corresponding reference numerals and detailed explanation thereof will be omitted.

Further, a state in which the ball and thread device of the fourth embodiment is incorporated in a linear actuator is the same as that shown by FIG. 10.

According to the third and fourth embodiments, since the ball and thread device does not require a returning tube for circulating a ball and a die constituting a feed screw and is accordingly reduced in size, the design of a compact electric linear actuator for use in a narrow place is easily carried out.

What is claimed is:

1. An electric linear actuator comprising:

an output shaft which is displaceable in an axial direction and non-rotatable about its axis and which has one end thereof coupled to a driven device;

a cylindrical member arranged coaxially with said output shaft and rotatably about said output shaft, and driven in rotation by an electric motor; and a feed screw mechanism arranged between said output shaft and said cylindrical member for converting a rotating motion of said cylindrical member to a linear motion of said output shaft, said feed screw mechanism including:

a male spiral groove formed in an outer peripheral surface of said output shaft;

a nut cylinder secured on an inner peripheral surface side of said cylindrical member and having a female spiral groove formed in an inner peripheral surface thereof, and formed with a communicating path extending in a direction orthogonal to said female spiral groove and communicating between two adjacent portions of said female spiral groove spaced in the axial direction;

a plurality of balls accommodated between both spiral grooves; and a pair of deflectors respectively secured toward opposite end portions of said female spiral groove for returning moving balls from each of said adjacent portions to the other through said communicating path.

2. A linear actuator according to claim 1, wherein said nut cylinder comprises a first cylinder member having the communicating path formed therein in a long hole shape and a second cylinder member fitted around an outer peripheral side of said first cylinder member to form a groove bottom surface for the communicating path.

3. A linear actuator according to claim 1, wherein said deflectors are of helical configuration having the same pitch as said female spiral groove and are securely fitted in said female spiral groove.

4. A linear actuator according to claim 3, wherein said deflectors are fitted at opposite ends of said female spiral groove.

5. An electric linear actuator comprising:

an output shaft which is displaceable in an axial direction and non-rotatable about its axis and which has one end thereof coupled to a driven device;

a cylindrical member arranged coaxially with said output shaft and rotatably about said output shaft, and driven in rotation by an electric motor; and a feed screw mechanism arranged between said output shaft and said cylindrical member for converting a rotating motion of said cylindrical member to a linear motion of said output shaft, said feed screw mechanism including:

a male spiral groove formed in an outer peripheral surface of said output shaft;

a communicating path from in the outer peripheral surface of said output shaft and communicating between two adjacent portions of said male spiral groove spaced in the axial direction;

a nut cylinder secured on an inner peripheral side of said cylindrical member and formed with a female spiral groove;

a plurality of balls accommodated between both spiral grooves; and a pair of deflectors respectively secured toward opposite end portions of said male spiral groove for returning moving balls from each of said adjacent portions to the other through said communicating path.

6. A linear actuator according to claim 5, wherein said communicating path extends in a direction orthogonal to said male spiral groove.

7. A linear actuator according to claim 6, wherein said deflectors are of helical configuration having the same pitch as said male spiral groove and are securely fitted in said male spiral groove.

8. A linear actuator according to claim 5, wherein said deflectors ae of helical configuration having the same pitch as said male spiral groove and are securely fitted in said male spiral groove.

9. A linear actuator according to claim 8, wherein said deflectors are fitted at opposite ends of said male spiral groove.

* * * * *